United States Patent [19]

Coyle et al.

[11] 4,382,833
[45] May 10, 1983

[54] VACUUM LAMINATION FIXTURE

[75] Inventors: Peter J. Coyle, Oaklyn; Marvin S. Crouthamel, Pennsauken, both of N.J.

[73] Assignee: RCA Corporation, New York, N.Y.

[21] Appl. No.: 296,227

[22] Filed: Aug. 25, 1981

[51] Int. Cl.³ .............................................. B32B 31/20
[52] U.S. Cl. ................................... 156/382; 156/104; 156/285; 100/93 P; 100/211; 100/295; 100/296
[58] Field of Search ............... 156/104, 285, 382, 580, 156/581; 100/211, 93 P, 295, 296

[56] References Cited

U.S. PATENT DOCUMENTS

| 4,018,427 | 4/1977 | Marulli | 259/81 |
| 4,184,903 | 1/1980 | Lovelace et al. | 156/285 |
| 4,234,373 | 11/1980 | Reavill et al. | 156/382 |
| 4,239,555 | 12/1980 | Scharlack et al. | 156/104 |

FOREIGN PATENT DOCUMENTS 53-3006341  1/1978  Japan ................................: 156/285

OTHER PUBLICATIONS

"Spi-Laminator Photovoltaic Module Laminator," Spire Corp. Catalog.
NASA Tech. Briefs, "Fixture for Assembling Solar Panels", vol. 4, No. 1, NASA Jet Propulsion Laboratory.
IBM Technical Disclosure Bulletin, "Thin Foil Laminator", Mar. 1967, vol. 9, No. 10.

Primary Examiner—Caleb Weston
Attorney, Agent, or Firm—Joseph S. Tripoli; Robert L. Troike; William Squire

[57] ABSTRACT

An apparatus for laminating a solar cell structure includes upper and lower housing members and an intermediate member which includes a flexible membrane. The members form upper and lower sealed chambers which can be selectively evacuated. The solar cell structure is placed between the membrane and a parallel rib structure in the lower chamber. Heater elements and reflectors between the ribs are employed for radiating heat energy to the solar cell structure during the laminating process for melting a potting material therein, while both chambers are evacuated. Then air is admitted to the upper chamber to cause the membrane to compress the laminated structure against the parallel rib support means while the laminated structure cools.

11 Claims, 3 Drawing Figures

VACUUM LAMINATION FIXTURE

The present invention relates to a fixture for laminating large sheets of material such as sheet structure enclosing a solar cell array.

Laminated solar cell arrays, in one form, comprise a tempered glass sheet on one side and a flexible film such as thermoplastic material on the other side. Sandwiched between the film and the glass sheet is a solar cell array whose cells are interconnected either in series or in series-parallel. The cells are between two sheets of an electrically insulating potting compound which is optically transparent and thermally conductive. One such potting material may be ethylene vinyl acetate (EVA). One sheet of EVA is between the solar cell array and the film and a second sheet of EVA of like thickness is between the solar cell array and the glass sheet. When the EVA material is heated above a given temperature, it melts and becomes tacky, adhering the film and the glass sheet to the solar cell array. Further, it is also desirable that EVA, when melted, flow into the spaces between the solar cells. To do so, the entire laminate structure is subjected to compressive pressures after the EVA and remaining elements are heated.

Lamination fixtures for providing heat and pressure to melt the EVA and force it into the spaces among the various cells are known. However, these fixtures are not entirely satisfactory. In one form, a lamination fixture comprises a relatively large tub having upper and lower chambers. A grid structure is suspended across the lower chamber and secured at its ends to the peripheral wall of the tub. Heater elements are below the grid structure between the tub chamber lower wall and the grid structure. An intermediate member comprising a planar frame member has a central opening larger than the solar cell lamination dividing the tub into the lower and upper chambers. A thermoplastic sheet is secured to the frame member over the frame opening. The tub has upper and lower flanged members which hermetically seal against the intermediate frame to provide, with the intermediate member, the upper and lower chambers.

The upper and lower chambers are then evacuated. After a vacuum is achieved, the heater elements are energized and they, hopefully, radiantly heat the EVA material sufficiently to melt it. After a sufficient time interval during which it is expected that the EVA material will become completely melted, the upper chamber is opened to the ambient and returned to atmospheric pressure. The atmospheric pressure compresses the intermediate member thermoplastic film against the upwardly facing lamination film over the solar array structure resting on the grid support in the lower chamber. The double chamber process described is employed to prevent pressing the laminate together prior to the softening of the pottant (such as the EVA) to preclude fracturing the cells due to the unevenness of the laminate support grid structure and the resulting local stresses.

The above fixture has not been entirely satisfactory. The size of the lamination structure is relatively limited. Enlarging the tub to laminate larger arrays, e.g., four feet on a side, may cause breakage of the glass sheet during the compressing step. Further, the heating of the EVA material has not always been uniform resulting in non-uniform potting.

Other laminating fixtures employ contact heater plates for applying heat directly to the structure to be laminated. These fixtures also are not entirely satisfactory. Contact conductive heating of glass is undesirable. Tempered glass sheets tend to be wavy on the surface and, therefore, have spaced points of contact with a plane heater plate. This tends to create local stresses when the glass is subjected to heat or pressure. These stresses tend to fracture the glass. The spaced contact points tend to apply localized heating, resulting in thermally induced stresses. Further the contact heaters are usually imbedded in a thermal mass. The mass is relatively large due to the required plate thickness that must be used to limit the amount of deflection of the plate when under compressive stress during the process. This mass, being large, requires a relatively long time to become heated to the desired temperature. This thermal lag may be of such long duration for large laminating structures that it becomes unwieldy and therefore, makes control of temperature difficult.

The glass industry employs several methods to heat glass. One involves convectively heating the glass in an autoclave in which hot pressurized air is blown over the glass. In another method, now in disuse, the glass is dipped in hot oil. A different method employs radiant heat. The radiant heat, as employed in the fixture described above, is not entirely satisfactory as the thermal flux applied to the structure being laminated is not always uniform.

In accordance with the present invention, an apparatus for laminating a plurality of elements into a planar structure includes upper and lower housing members. An intermediate member between the housing members includes a flexible portion. The members form upper and lower sealed chambers. Means selectively form a vacuum in each of the chambers. The flexible intermediate member compresses the elements against the lower housing member when the lower chamber has a pressure lower than that of the upper chamber.

The improvement includes element support means against which the elements bear during the compression step. The support means include a plurality of rib members which are supported at their lower edges at a plurality of spaced locations on the lower housing and terminate at their upper edges in a given element support plane. Radiant heater means located between adjacent ones of the rib members in the spaces intermediate the upper and lower rib edges are employed for heating the elements and effecting the lamination.

Figure 3:
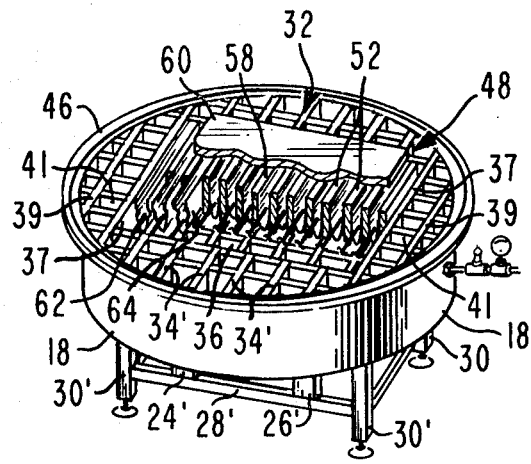
FIG. 3 is a sectional view through a fixture embodying the present invention.
Figure 1:
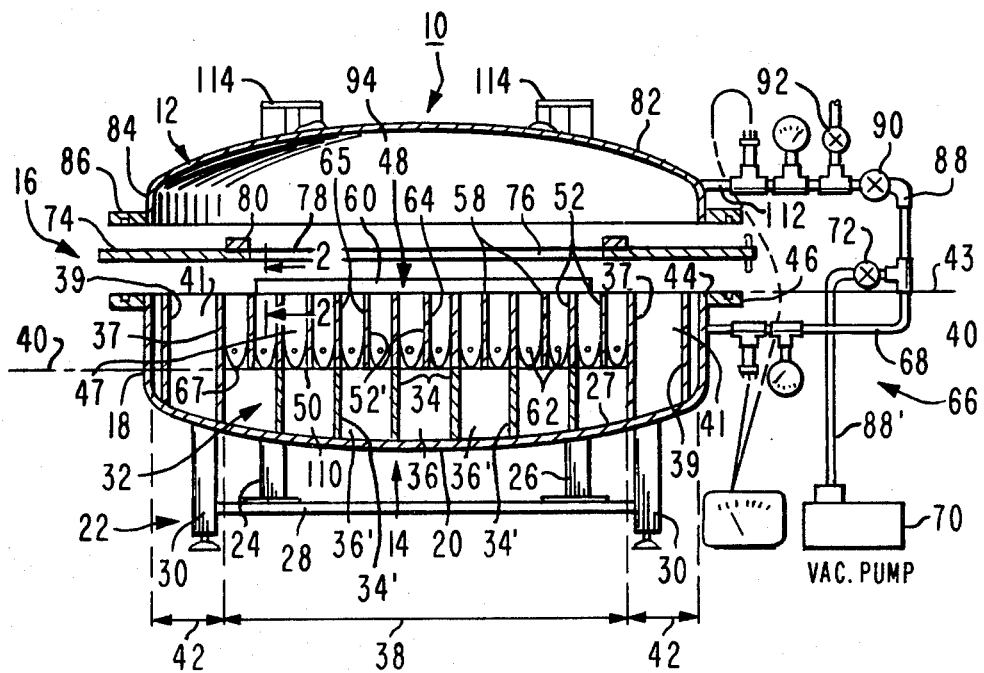
FIG. 1 is an isometric view of a portion of a laminating chamber embodying the present invention.

In FIG. 1, laminating fixture 10 comprises upper housing member 12, lower housing member 14, and intermediate member 16. Member 14 has a circular cylindrical vertical side wall 18 and a curved horizontally oriented bottom wall 20 which may be a segment of a sphere and may be sheet steel. The bottom wall 20 is supported on a support structure 22, via four spaced support posts 24, 26, and 24', 26' (FIG. 3) mounted on respective cross members 28, 28'. Cross members 28, 28' are respectively secured to vertical supports 30, 30'.

Within the lower housing member 14 is grate structure 32. The grate structure 32 comprises a plurality of parallel sheet ribs, such as ribs 34, 34' and so on, which may be formed of steel and whose length dimensions extend across bottom wall 20 perpendicular to the drawing sheet and whose end and bottom edges are welded to walls 18 and 20, respectively.

A plurality of sheet ribs 36, 36' also may be formed of steel and which may comprise relatively short sections between ribs 34, 34' and so on and extend in a direction normal to walls 34, 34' parallel to the plane of the drawing sheet. Ribs 36 are welded at their end edges to ribs 34, 34' or wall 18 as the case may be, and at their bottom edges 27 to wall 20. The resulting structure formed by the ribs resembles an "egg crate" grate assembly. The ribs of structure 32, such as ribs 34 and 36 form squares which may be six inches on a side. The ribs of structure 32 distribute vertically applied forces in a direction from the top to the bottom of the drawing to bottom wall 20. The bottom wall 20, being relatively spherical, being supported by structure 22, and having a thickness sufficiently great to absorb the applied stresses without bending, absorbs such stresses without significant strain. The combined welded rib structure 32 and bottom member 14 form a relatively rigid assembly which is especially suitable for absorbing vertically applied stresses with negligible bending of the member 14 or structure 32. This is important as will be discussed below.

The upper edge of the ribs 34, 34', 36, 36' and so on in a square central region 38 terminate in a plane 40. The region 38 may comprise, for example, an area 4 feet×4 feet. This area has dimensions larger than that of the structure 60, to be laminated. The upper edges of the ribs of structure 32 in the peripheral region 42 surrounding region 38, including representative peripheral ribs 37, 39, and 41 as well as the peripheral portions of ribs 34, 34', 36, 36' and so forth in the region 42, terminate coplanar with the upper edge 44 of wall 18 in plane 43 which is spaced vertically above plane 40. Thus the upper edges of the ribs in central region 38 lying in plane 40 form a recess with respect to the ribs in region 42. Circular flange 46 extends around and is welded to the upper outer edge of wall 18. Ribs 34, 36, 34', and 36' and so forth all have holes (not shown) which permit air to flow into the various subchambers formed by the ribs.

A lamination support fixture 48, which may be removable, rests on the upper edges 50 of ribs 34, 34', 36, 36' and so on in plane 40 in central region 38. Structure 48 comprises a plurality of like dimensioned parallel ribs 52. Ribs 52, which may be sheet steel, stand upright on the lower edges and extend across region 38. Ribs 52 may be spaced, for example, three inches center to center. The ribs 52 in FIG. 1 extend in and out of the drawing normal to the plane of the drawing sheet. The ribs 52, upper edges 58 terminate in plane 43 and serve as a support for the solar array structure 60 to be laminated. Support structure 48 is nested between the innermost ribs of structure 32, such as ribs 37 located in the peripheral region 42. Structure 48 includes end ribs 47, FIG. 1, parallel to rib 41, known in the art as keepers, which are welded to the end edges of the ribs 52 forming rigid structure 48 which is box-like in shape. A bar (not shown) parallel to ribs 47 is adjacent to the lower edges of and welded to the ribs 52.

A radiant heater element 62 is located in the space between each pair of adjacent ribs 52. The heater elements 62 are parallel elongated bars and are electrically connected to a power source (not shown) to radiantly heat the space between the ribs 52. Reflectors 64, which may be polished aluminum sheet members, are located in the spaces between ribs 52. Reflectors 64 form parallel troughs whose side walls are secured to ribs 52 and whose open area faces upwardly toward member 12. The elements 62 are secured to reflectors 64. The reflectors 64 may comprise upper plane sidewall sections 65 and lower circular or parabolic cylindrical sections 67 extending the length of ribs 52. The upper edges of sections 67 terminate at points where the sections 67 are tangent to the corresponding ribs 52. The planar reflector sections 65 are secured to each of the ribs 52 at the upper edges of the circular or parabolic sections and terminate at their upper edges at plane 43. A trough reflector is thus formed entirely within the space formed by ribs 52. Most of the radiation from the heater elements 62 is reflected toward the structure 60. In the alternative reflectors 64 may comprise a single reflector sheet instead of a separate circular and plane sections.

Intermediate member 16, FIG. 1, comprises a frame 74 formed of a circular ring of sheet steel which is over flange 46 at its outer surface and over a portion of structure 48 at its central square opening 76. Flexible membrane 78, which may be made of fibre glass reinforced rubber sheet, e.g., silicone rubber, is secured over frame 74, opening 76. Membrane 78 which is not adversely affected by the elevated temperatures to which it is exposed, is hermetically sealed to frame 74 by clamp 80. The opening 76 is dimensioned to fit around the structure 60 and is approximately coplanar therewith. An O-ring sealing device (not shown) in a groove in flange 46 seals the frame 74 to flange 46. The member 16 and member 14 form a sealed lower chamber 110.

Upper member 12 has a generally horizontally oriented wall 82 which may be spherical and integral therewith is downward depending cylindrical vertical side wall 84. The cylinders formed by side walls 84 and 18 are coextensive. A flange 86 extends from the outer peripheral edge of wall 84 over flange 46. Flange 86 has a circular groove therein for receiving an O-ring sealing device (not shown) for sealing flange 86 to frame 74. The flange 86 is clamped to flange 46, clamping the frame 74 therebetween. The interiors of the fixture 10 formed by members 12, 14, and 16 are hermetically sealed by the O-rings. Members 12 and 16 form an upper sealed chamber 94. Membrane 78 rests over and on the structure 60 which is in lowr chamber 110.

A vacuum pump 70 is connected by pipes 112, 88, and 88' and valves 72 and 90 to member 12 to evacuate the chamber 94 when valve 90 is opened. Valve 92 connects valve 90 and chamber 94 to the ambient. Valve 92 is closed when chamber 94 is evacuated. Pump 70 is connected to chamber 110 by pipes 88' and 68 and valve 72. Pump 70 evacuates the chamber 110 between all of the ribs via the openings (not shown) in the ribs when valve 72 is opened and valve 92 is closed.

Figure 2:
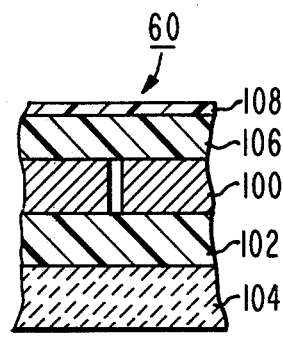
FIG. 2 is a sectional view of a portion of the structure to be laminated.

The structure 60 to be laminated, FIG. 2, includes an interconnected solar cell array 100 resting over a layer 102 of EVA which is over a tempered sheet of glass 104. The glass 104 rests centrally on structure 48 at plane 43, FIG. 1. A second layer 106 of EVA is over the other surface of the solar cell array 100. A Tedlar (a trademark for a thin thermoplastic sheet) layer 108 is on EVA layer 106. The Tedlar layer may be 2 or 3 mils thick, the EVA layers 102 and 106 may be 15–20 mils thick, and the solar cells of array 100 may be 10 to 20 mils thick. The solar cells of array 100 are interconnected in series or series-parallel in a known manner.

The structure 60 of FIG. 2, after being placed on the upper edges 58 of ribs 52 of support structure 48, is covered with the flexible membrane 78 with the frame 74 resting on flange 46. The closing cover member 12 has its flange 86 engaged with frame 74 and the two flanges 46, 86 and the frame are then clamped to hermetically seal upper chamber 94 between member 16 and member 12, and lower chamber 110 between member 14 and member 16.

The vacuum pump 70 is started, the valves 90 and 72 being open, and the valve 92 closed. The pump simultaneously evacuates both chambers 94 and 110. After the vacuum is created in chambers 94 and 110, electrical energy is applied (by a source not shown) to the heater elements 62, which radiate in radial directions normal to the long axes of the elements 62. Reflectors 64 reflect most of the radiant energy toward the tempered glass 104 next adjacent the opened ends of the channels formed by the ribs 52. This radiation is absorbed by the glass 104 and the heat is conducted to the EVA layers 102 and 106, and solar cell array 100, melting the layers 102 and 106. After a sufficient time interval, in which it has been determined in a known manner that the EVA layers have melted, chamber 94 is then opened to ambient atmospheric pressure. To open chamber 94 to the ambient, valve 90 is closed and valve 92 opened slightly to permit ambient air to slowly enter chamber 94 through pipe 112. The ambient atmospheric pressure in chamber 94 compressively forces the membrane 78 against the structure 60, FIG. 2, due to the vacuum present in lower chamber 110, compressing all of the elements of structure 60 together against the rib structure 48.

The grate structure 32 described above formed by ribs 34, 36 and so forth which supports the structure 48 remains relatively rigid in the presence of these compressive forces and, therefore, relatively prevents the bending of the lamination structure 60. This relative rigidity is enhanced by the relatively uniform distribution of the compressive forces to bottom well 20 beneath structure 60. After a time interval, the vacuum in lower chamber 110 is removed by closing valve 72 and opening valve 90 placing ambient air pressure in the lower chamber 110 via pipe 68. When the pressures in the lower and upper chambers have equalized, the upper housing member 12 is unclamped and then lifted via hoisting hooks 114.

The spacing between the upstanding ribs 52 of structure 48 is about half the spacing of the ribs of structure 32. Alternate ribs 52 of structure 48 are aligned with and above a lower rib such as ribs 34, 34'. The forces of atmospheric pressure in chamber 94 against the lamination structure 60 are transmitted to ribs 52 of structure 48 and then to the ribs 34, 34', and so on of the grating structure 32 supporting ribs 52. Further, since alternate ones of the ribs 52 are aligned (coplanar) with the ribs 34, 34' and so on, those ribs 52 directly transmit their load to the latter ribs. The intermediate ribs of structure 48 such as ribs 52' transmit their loads to the short ribs such as 36, 36'.

The structure 32 supports structure 48 uniformly so that structure 48 exhibits negligible bending, thus precluding fracturing of the glass sheet 104, FIG. 2 due to such bending. Further, relatively large areas may be laminated by a system as described above without failure due to bending of the supporting structure. For example, the structure 60 being about 4 feet×4 feet, is believed larger than any known glass laminated structure. Even larger structures to be laminated may be accommodated by a fixture constructed in accordance with the present invention.

What is claimed is:

1. In an apparatus for laminating a plurality of elements including two sheets and a substance between them which softens when heated into a planar structure, said apparatus including upper and lower housing members, an intermediate member including a flexible portion, said members forming upper and lower sealed chambers, means for selectively forming a vacuum in each of said chambers, said intermediate member compressing said elements against said lower housing member when the lower chamber has a pressure lower than that of the upper chamber, the improvement comprising:

element support means against which said elements bear during the time they are being compressed including a plurality of rib members supported at lower edges thereof at a like plurality of spaced locations by said lower housing member and terminating at their upper edges in a given element support plane; and element heater means between adjacent ones of said rib members intermediate said upper and lower edges for heating the structure being laminated to a temperature sufficiently high to soften the substance between the two sheets.

2. The apparatus of claim 1 wherein said rib members include a plurality of parallel upstanding walls forming a plurality of parallel troughs, said heater means comprising a plurality of heater elements, each in a different trough.

3. The apparatus of claim 2 wherein said heater elements emit radiant energy, said heater means further includes reflector means in each trough for directing radiant heat energy from said heater elements toward the space between said upper edges.

4. The apparatus of claim 1 wherein said rib members are supported at their lower edges by a support structure, said support structure comprising a plurality of spaced upstanding ribs having a lower edge abutting said lower housing member and an upper edge terminating in a plane, said rib members being adapted to rest on the upper edges of said ribs.

5. The apparatus of claim 1 wherein said housing members each include a spherical portion and a peripheral cylindrical portion depending from the spherical portion which, when joined, form upper and lower cylindrical chambers each having a spherical end portion, said intermediate member separating said upper and lower chambers, said means for forming a vacuum including means for forming a vacuum initially in both said chambers and then a vacuum in only said lower chamber.

6. The apparatus of claim 1 wherein said support means comprises first and second support sections, said first section comprising a first plurality of planar rib members upstanding from and supported by said lower housing member at uniformly spaced points thereon in a first given array, and a second plurality of planar rib members secured in a second given array and adapted to releaseably rest on said first plurality of rib members at one of their edges, said rib members being spaced to distribute an edge applied load uniformly over said lower housing.

7. The apparatus of claim 6 wherein said rib members comprise parallel sheet members, certain of the rib members of said first and second plurality being coplanar.

8. The apparatus of claim 1 wherein said rib members form parallel troughs, said heater means comprising an elongated heater element in each trough for emitting radient heat energy, and reflector means in each trough for directing said heat energy in a direction toward said upper housing member.

9. The apparatus of claim 8 wherein said reflector means comprises a circular reflector trough having plane reflector side walls each extending along the length of said side walls, the upper edge of said side walls each terminating at a rib member upper edge.

10. The apparatus of claim 1 wherein said support means comprises a first array of planar rib members fixed in a first grid spacing to said lower housing at uniformly spaced locations on said lower housing and a second array of planar rib members fixed in a second grid spacing and adapted to be secured to said first array with a portion of ribs of the first and second array of rib members being coplanar.

11. In an apparatus for laminating a relatively large sheet structure which comprises two sheets with a material between them which softens when heated to permit the two sheets to be forced toward one another and which material hardens when permitted to cool while pressure is applied to the two sheets whereby a laminated structure is formed, the apparatus including upper and lower vacuum chambers between which the sheet structure to be laminated is placed, a support structure in the lower chamber on which the sheet structure rests, a means for heating the sheets while the two chambers are evacuated, and a means for compressing the sheets against the support structure during the time air is admitted to the upper chamber while the lower chamber remains evacuated and while the sheet structure cools, the improvement comprising:

said support structure comprising a grid formed with grid elements terminating in a plane on which the sheet structure is supported while it is being laminated, the grid elements extending substantially normal to said plane and extending from a firm supporting base structure, said support structure thereby forming a right support structure for the sheet structure being laminated, the grid elements forming cavities between them; and radiant heating means located in the cavities formed in said grid for heating said structure being laminated during the time both chambers are evacuated.

* * * * *